Nov. 4, 1969   J. A. POWERS   3,476,265
ARTICLE HANDLING APPARATUS
Filed May 10, 1967
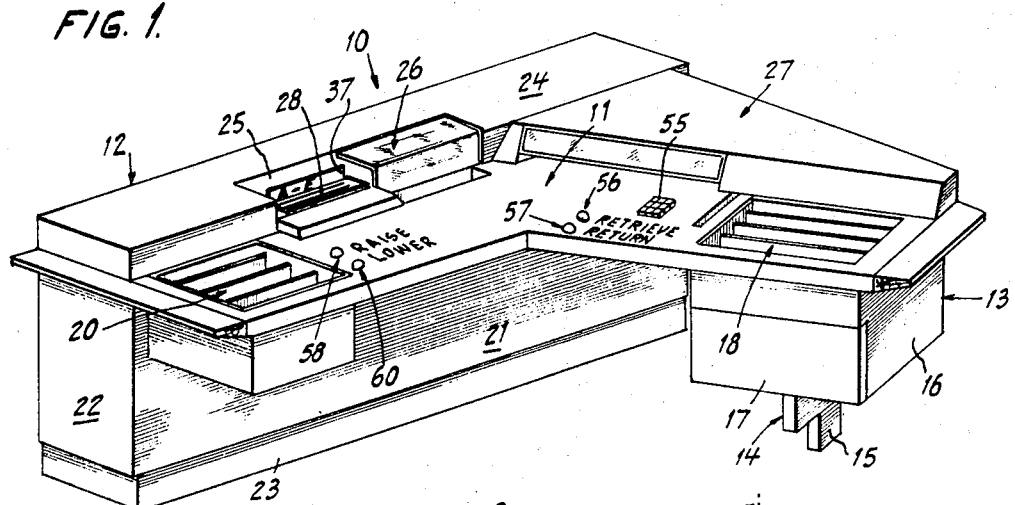
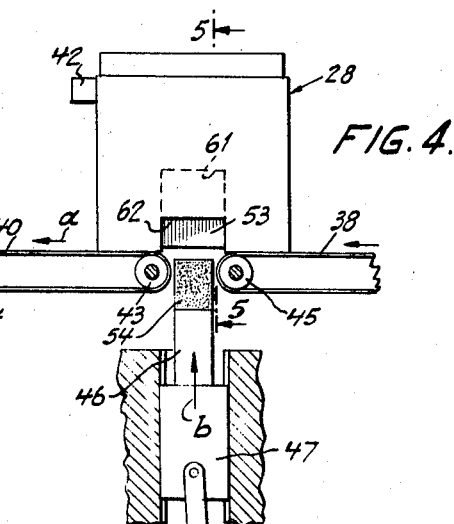
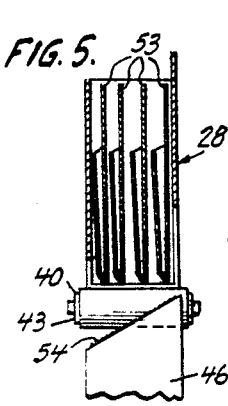
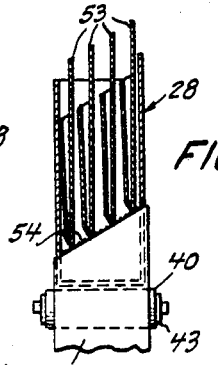
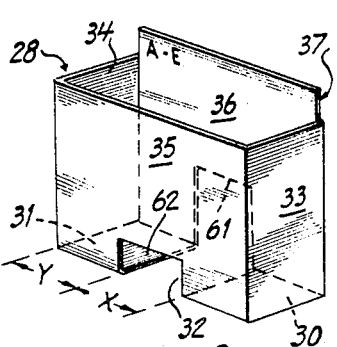
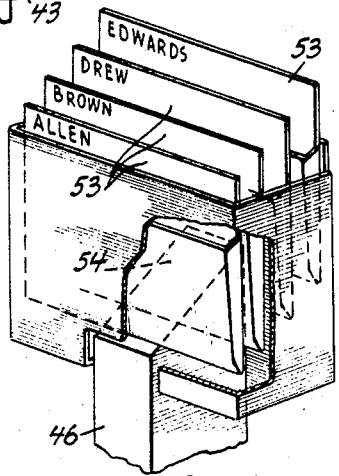
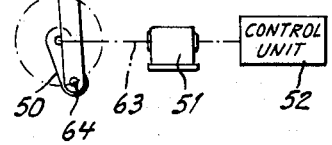
INVENTOR
JOSEPH A. POWERS
BY Frank A. Seeman
ATTORNEY ` # United States Patent Office 3,476,265
Patented Nov. 4, 1969

3,476,265
ARTICLE HANDLING APPARATUS
Joseph A. Powers, Williamsville, N.Y., assignor to Sperry Rand Corporation, New York, N.Y., a corporation of Delaware
Filed May 10, 1967, Ser. No. 637,446
Int. Cl. B25j 3/00; B65b 21/02; A47b 97/02
U.S. Cl. 214—1
8 Claims

ABSTRACT OF THE DISCLOSURE

Apparatus for handling article carrying containers after they have been manually or automatically retrieved from a storage area and delivered to a work station. The containers, are adapted to accommodate a plurality of articles, such as documents or the like, and further are provided with a cutaway portion exposing the documents. A lifting device disposed at the work station is adapted to register with the cutaway portion to partially lift the documents from the container for convenient viewing thereof to facilitate identification and removal of a selected document. When refiling of a retrieved document is desired the apparatus functions in a reverse manner.

Background of the invention

The present invention relates to article handling apparatus of the nature described above and more particularly to new and useful improvements in apparatus for facilitating document handling at a work station to provide ready accessibility to any one of a plurality of articles in an automatic or manual retrieval system.

It is well known in the article handling art to provide automatic equipment for selectively retrieving and ultimately refiling one or more of a plurality of stored articles. Likewise, it is not uncommon to semi-automatically or manually retrieve and refile articles in a manner similar to, but slower than the automated methods. For example, equipment of this nature is readily adaptable for use in library, warehouse and office storage systems as well as banking, insurance and government facilities where efficient access to stored records is a continued problem with which they are faced.

Regardless of the nature of the business involved, or whether the retrieval method is automatic, manual or semi-automatic, there is generally a common final step of delivery of the retrieved article or articles to a work station whereupon an operator or a machine takes some action, i.e., inspection, use or disposition in accordance with the nature of the particular article. Upon completion of such action, the article is normally returned to its original stored location. The present invention is particularly involved in the handling of article carrying containers (and the articles therein) subsequent to delivery of retrieved containers to a work station. In one embodiment, for exemplary purposes, the invention is described as it relates to retrieval and filing apparatus for containers carrying a plurality of file folders or the like.

To further illustrate the environment involving article handling apparatus wherein documents or file folders are initially retrieved (automatically or manually) from either a prearranged or random array, reference is made to the copending patent application, assigned to a common assignee, entitled "Article Handling Apparatus," filed Feb. 23, 1967 and bearing Ser. No. 618,119. This application discloses and describes new and useful improvements in an extractor mechanism, and more generally describes an overall system in which an operator work station is located remotely from the actual storage area. In equipment of this nature, many problems have been encountered in attempts to efficiently provide for convenient operator manipulation of the articles involved at the work station after the container has been successfully retrieved and delivered thereto.

To facilitate reliable operation, increase overall speed of retrieval and filing cycles, as well as the elimination of many filing errors the inventor established that the most expeditious manner of selecting an article from the container in a system of the general nature described includes as a basic principle, the non-handling of the container itself. For example, rather than removing the container and/or all its contents from its retrieved, or "at rest" position, it is most beneficial to remove the desired article (document, file folder or the like) from the container and retain only the withdrawn article at the work station for necessary action. Meanwhile, the container may be refiled, thereby leaving the overall system free for the retrieval and general handling of other desired containers. When the removed article or articles are no longer needed they may be temporarily stored and refiled in the future by the operator at such time as the equipment is not in use. Such refiling operation obviously requires the same conveniences and advantages as discussed above with respect to retrieval.

Summary of the invention

The present invention contemplates article handling apparatus of the type referred to in the above abstract. The improved arrangement includes, in combination, a container for accommodating flat articles such as documents or the like, a transport mechanism for delivering the container to a work station, and a lifting device disposed at the work station, and adapted to cooperate with the transport mechanism and container, whereby the articles carried by the container are lifted for display to the operator at the work station. This lifting feature facilitates rapid access to the articles and ready discovery of a particular article within the retrieved container.

In one embodiment, the novel article handling apparatus of the present invention is adapted for use in an information storage and retrieval system of the nature described in the above mentioned patent application, wherein boxlike containers are ultimately delivered to a work area. The containers as herein shown more specifically, accommodate a plurality of file folders, each of which has specified documentary contents and includes a conventional identifying tab. The container further includes a cutaway portion adapted to receive a driven element included as an integral part of the lifting mechanism. The driven element engages the bottom edges of the file folders by means of a slanting serrated surface. Thus, when a container is delivered to the work station, the lifting mechanism moves the element against the documents whereby the mentioned surface engages the file folders and displays their respective identifying tabs in a convenient echelon array. This permits ready discovery and access of the contents of the container without necessitating removal of such container from its position at the work station of the equipment.

The foregoing and other objects, features and advantages of the invention will appear more fully hereinafter from a consideration of the detailed description which follows, in conjunction with the accompanying sheet of drawing wherein one principal embodiment of the invention is illustrated by way of example. It is to be expressly understood however, that the drawing is for illustrative purposes only and is not to be construed as defining the limits of the invention.

Brief description of the drawings

FIG. 1 is a perspective view of the console of an article handling system in which the improved apparatus embodying the present invention may be readily employed.

FIG. 2 is a perspective view of the unique container which is part of the novel combination of the present invention.

FIG. 3 is a diagrammatic illustration of a conveyor system readily adaptable for use in the console shown in FIG. 1.

FIG. 4 is a diagrammatic side view of the novel combination comprising the present invention, shown partially in schematic illustration for clarity.

FIG. 5 is a sectional view taken along line 5—5 of FIG. 4.

FIG. 6 is a sectional view similar to the view of FIG. 5 but showing the elements of the invention at a later stage in the sequence of operation.

FIG. 7 is a partially cutaway perspective view showing the container, a portion of the lifting member and a plurality of file folders disposed in a display echelon.

Description of the preferred embodiment

Now referring to the drawing for a more detailed description, the operator work station of an article handling system is shown in FIG. 1, to illustrate by way of example the type of equipment in which one embodiment of the present invention is readily employed. The reference numeral 10, generally designates a console at which one or more persons may be stationed for the purpose of operating a remote information storage and retrieval mechanism. A work table 11 is provided to facilitate manipulation of retrieved articles. For exemplary purposes, the console 10 shown is adaptable for use with a retrieval system of the nature disclosed in the above mentioned patent application, entitled "Article Handling Apparatus," wherein the extraction and filing functions are carried out in response to operator commands at a similar console. As is common in most information retrieval systems the retrieved articles in the mentioned disclosure are ultimately delivered to a work area, whereupon appropriate action or non-action is taken. The present invention is directed to novel article handling apparatus adapted to function in a new and useful manner with regard to the final delivery of the articles in the vicinity of such work area.

Console 10 includes a main body portion 12 with work table 11 extending therefrom. The outwardly projecting end of work table 11 extends over a pedestal 13, comprising a base portion 14 including a supporting foot 15, and a storage section 16 including a drawer 17 and an open sectionalized compartment 18 accessible through a cutout portion of table 11. The other end of table 11 is also provided with an opening for accommodating a similar sectionalized compartment 20. Main body portion 12 is enclosed by front panel 21, end panel 22, base kick plate 23, and top panel 24, all of which are visible in FIG. 1. A similar back panel (not shown) completes the enclosure. The right end (not shown) is at least partially open for reasons rendered obvious from the following description of the conveyance mechanism.

Referring in further detail to console 10 an access opening 25 is provided in the top panel, through which opening the operator is permitted to receive and deposit articles such as documents, or the like. Opening 25 is sufficiently large to permit an article carrying container (of the nature described hereinbelow) to pass therethrough. A transparent section 26 is provided adjacent opening 25 to enable the inside of main body portion 12 to be partially visible to an operator at his normal work position, i.e., sitting or standing in the vicinity of table 11 adjacent opening 25. A compartment 27 is adapted to enclose electrical circuitry and related components utilized in the operation of console 10. The circuitry and components are more particularly of the type used in keyboard mechanisms, motor control switching mechanisms, etc., all of which are not directly related to the present invention, in that regardless of the particular remote storage and retrieval system involved, the function and resulting operation of the present invention is not effected.

A rectangular container 28, shown in FIG. 2, is employed to carry articles to access opening 25. Container 28 generally comprises an open-ended, box-like compartment defined by a bottom wall and upwardly extending side walls. The bottom wall comprises two coplanar rectangular sections 30 and 31 disposed on opposite sides of a slot 32, consisting of a cutaway portion which has a length dimension $x$ approximately equal to the length dimension $y$ of sections 30 and 31. The side walls include two opposing end sections 33 and 34, a front section 35 and a rear section 36. A tab 37 extends upwardly from rear section 36 and if desired appropriate identifying indicia may be marked thereon. A randomly selected container 28 is shown at rest in access opening 25 of console 10 (FIG. 1), which container includes an identifying tab 37 extending for ready identification of the container contents. Container 28 is conveyed to access opening 25 by means of a conveyor system including conventional belts, pulleys and drives therefor.

Now referring to FIG. 3, a conveyor system adaptable for use in console 10 is diagrammatically illustrated. Roman numerals I, II, III and IV designate various positions in the path of travel of a selected container. At position I the container is traveling to the left on a belt 38. The container is stopped at position II spanning the space between belt 38 and a second belt 40, which position corresponds to the container position in the access opening, as shown in FIG. 1. Subsequentially, as discussed in the operational description below, the container continues leftwardly on belt 40 a short distance until it is transferred to a third belt 41, moving to the right, whereupon the container moves from transferred position III to position IV and finally out of the console and back to the storage area from whence it originally came.

A container 28 at position II is shown in FIG. 4. A latch 42 is operative to restrain leftward motion of the container, whereby it rests straddling the space between belt 38 and belt 40. Belt 40 is driven in the direction of arrow $a$ on rollers 43 and 44 and belt 38 is likewise driven in the same direction. Only one roller 45 is shown in the drive for belt 38; however, any appropriate number of drive and idler rollers may be employed in a conventional manner to support and convey articles. Lifting means are disposed below and adjacent the vicinity of position II, which means comprise a driven member 46 secured to slideably mounted block 47, a drive rod 48, an intermediate linkage member 50, drive motor 51, and a control unit 52.

The lifting means shown in FIG. 4 cooperate with container 28 in a manner whereby flat articles 53, such as file folders, disposed in the container may be partially lifted therefrom. More specifically, driven member 46 registers with slot 32 under conditions where container 28 is stopped by latch 42 at position II. Now referring to FIGS. 5–7, container 28 is shown at position II prior to registration of driven member 46 with slot 32. In FIGS. 6 and 7 the elements are shown after member 46 has been driven into registration with slot 32. Member 46 has the general configuration of a ramp and includes a slanted serrated surface 54. It should be noted that the angle of surface slope and the height of slot 32 in front and back sections, 35 and 36, respectively, permit surface 54 to engage the front and back sections of the containers at approximately the same time during the upward excursion of driven member 46. This relationship is illustrated in FIG. 6, wherein member 46 has been driven upwardly into engagement with a plurality of file folders 53. The perspective view of FIG. 7 shows folders 53 in the lifted position. It should be noted that member 46 in its uppermost position lifts container 28 from the surface of conveyor belts 38 and 40. This is illustrated in FIG. 6 by the space separating belt 40 from container 28.

The operation of the above described article handling apparatus can best be explained by following the flow of a document, or the like, through an exemplary problem in a typical information storage system. For the purposes of this description it is assumed that the information system involved comprises a business wherein each customer is associated with a folder identified by a tab bearing the surname of the customer. For example, if an employee needs the "Brown" file to review a particular document therein, a request would be transmitted to an operator at the console. Thereupon the following steps would be undertaken by an operator stationed at the console 10 shown in FIG. 1. The console controls shown in FIG. 1 for use by the operator are diagrammatic in nature to aid in the explanation of the overall system. These controls include a data entry keyboard 55, a "retrieve" push button 56 and a "return" push button 57. The controls further include on the left side of work table 11, a "raise" push button 58 and a "lower" push button 60 for controlling the lifting means.

Now returning to the "Brown" illustration, retrieval of the requested file is initiated by entering appropriate data at keyboard 55 whereupon the container carrying the "Brown" file is identified, and the information can then be stored or the retrieval apparatus (not shown) can be programed or otherwise prepared as required according to the system employed. The operator then presses the retrieve button 56, whereupon the selected container is conveyed along conveyor belt 38 (see FIG. 3) to position II (FIG. 3) where container travel is blocked by latch 42 disposed in the path of the container to retain the container in the position shown in FIG. 1. It should be understood that insofar as the present invention is concerned the container 28 may be manually delivered to position I (FIG. 3). Regardless of the retrieval mode, upon arrival of the selected container at position II the file folders in container 28 may be then raised in an echelon array (see FIG. 7) in the access opening 25 in console 10. This latter raising operation may be initiated by pressing the raise button 58. Alternatively, the operation may be automatically initiated when a container is conveyed against latch 42, as described below. In both instances the lifting means (FIG. 4) described hereinabove, are employed.

The "Brown" file folder then is conveniently displayed to the operator for ready access as illustrated by the lifted relationship between the selected container and the contents thereof. It should be noted that the container is identified by "A–E" on its tab and the folders therein relate to surnames beginning with the letters "A" through "E." The "Brown" folder can then be removed and placed in storage compartment 20 whereupon the container is then lowered by pressing lower button 60. The container can be held in the position shown or if continuous use of the console is desired the container may be returned to a storage area for later recall. Return of the container is initiated by pressing return button 57.

More specifically, operation of the lifting apparatus can be described by reference to FIG. 4 of the drawing. Belt 38 delivers a selected container 28 to position II (FIG. 3) whereupon latch 42 restrains the container against forward motion as mentioned above. Lifting member 46 is then driven upwardly in the direction of arrow $b$ to engage the lower edges of the file folders 53 in container 28. Now referring to FIG. 5, the lifting member is shown as it approaches the lower edges of file folders 53, shown in section. The lifted position is illustrated in FIG. 6. FIG. 6 also shows that during engagement with the folders and just prior to the uppermost excursion of the serrated slanting surface portion 54 of lifting member 46, the container is lifted from belts 40 and 38 by virtue of engagement between member 46 and the edges 61 and 62 of slot 32. (The latter mentioned edges are shown in FIG. 2.) This lifting action minimizes abrasion between the bottom surface of container 28 and the moving belts 38 and 40, which if desired may continue to be driven in direction $a$ during the time the file folders 53 are lifted from container 28, as shown in FIG. 7.

Conventional sensing means such as a microswitch may be associated with latching means 42 whereby the sensing of a container at position III enables control unit 52 to cooperate with motor 51 to rotate linkage element 50 abount motor shaft 63. Rotation of element 50 results in linear drive of block 47 via drive rod 48, rotatably attached to element 50, by a pivot pin 64. To this end, control unit 52 may include a clutch whereby the motor is energized for 180° rotation of shaft 63. As an alternative, semi-automatic operation may be employed wherein raise button 58 is employed to energize control unit 52 obviating the need for the mentioned means. It is now evident that block 47 will return member 46 to its non-extended position upon motor energization controlled by unit 52 to return the shaft 63 through its full 360° rotation to a position corresponding to the lowermost position of pivot pin 64. As mentined above, container 28 may be returned to the storage area by entry of the appropriate command at the display console table. Alternatively, the container may be retained at the access opening 25 of console 10 until appropriate action is taken with respect to the withdrawn document. In the latter instance, a transparent window 26 is provided to make the operator aware that a later called document container is available.

Many advantages of the present invention have been explicity and implicitly set forth in the above description. Prevalent among these advantages, is the ability for an operator to automatically display a plurality of retrieved document file folders so that each of the identifying tabs are readily visible. It should again be emphasized that this permits the minimum amount of operator handling of the container that accommodates the folders.

Although a specific embodiment of the invention has been illustrated and described in detail by way of example, it is to be understood that the invention is not limited thereto. Various changes may be made in the design and arrangement of parts without departing from the spirit and scope of the invention as will now be understood by those skilled in the art.

I claim:

1. In article handling apparatus having an operator work station, the combination comprising:
    (a) a plurality of substantially flat articles, each including top and bottom edges,
    (b) a container comprising a bottom wall and one or more upright side walls extending therefrom forming a compartment for accommodating said articles in an upright manner, said bottom wall having a slot therein; said bottom edges extending in a side-by-side relationship transversely across the portion of said slot in said bottom wall,
    (c) said bottom wall comprising two coplanar rectangular sections, said side walls comprising two opposing end sections extending in parallel from opposing ends of said rectangular sections, a front section and a rear section, all of which sections are formed in the configuration of an open-ended box,
    (d) said slot extends between said coplanar rectangular sections and continues into and terminates in the adjacent front and rear sections, said slot termination in said front section being at a lesser distance from said bottom than the termination of said slot in said rear section,
    (e) means for transporting said container and accommodated articles to the operator work station,
    (f) lifting means disposed at said work station, said lifting means including a driven member having a dimension not exceeding the width of said slot and including a substantially flat face portion adapted to enter the slot in an angular relationship with respect to said bottom wall and sequentially engage said bottom edges, said flat face portion sloping upwardly and rearwardly and extending a distance substantially beyond said front and rear sections under conditions where said driven member is urged into engagement with said edges transversely spanning said slot, and
(g) drive means for urging said driven member into registration with said slot under conditions where said container is resting at the work station, whereby said member engages the bottom edges of said articles and partially lifts the articles out of the open end of said container to display said top edges in an echelon type array,
(h) said drive means being adapted to urge said driven member into registration with said slot to the extent necessary to lift said container, whereby said container rests on said flat face portion.

2. In article handling apparatus having an operator work station, the combination comprising,
(a) a plurality of substantially flat articles, each including top and bottom edges,
(b) a container comprising a bottom wall and one or more upright side walls extending therefrom forming a compartment for accommodating said articles in an upright manner, said bottom wall having a slot therein;
(c) said bottom wall comprising two coplanar rectangular sections, said side walls comprising two opposing end sections extending in parallel from opposing ends of said rectangular sections, a front section and a rear section, all of which sections are formed in the configuration of an open-ended box,
(d) said slot extends between said coplanar rectangular sections and continues into and terminates in the adjacent front and rear sections,
(e) means for transporting said container and accommodated articles to the operator work station,
(f) lifting means disposed at said work station, said lifting means including a driven member having a dimension not exceeding the width of said slot and including a substantially flat face portion adapted to enter the slot in an angular relationship with respect to said bottom wall and sequentially engage said bottom edges,
(g) said transport means comprise first and second conveyor means each having continuous belts driven in the same direction and each having an upper span extending along a common axis and along a common plane, the upper span of said first conveyor spaced from the upper span of said second conveyor a distance sufficient to permit said driven member to extend through said space to enable said registration between said driven member and said slot at the work station, and
(h) drive means for urging said driven member into registration with said slot under conditions where said container is resting at the work station, whereby said member engages the bottom edges of said articles and partially lifts the articles out of the open end of said container to display said top edges in an echelon type array.

3. Article handling apparatus as set forth in claim 1, wherein said flat face portion is serrated for maintaining the initial relationship between said face and the bottom edges of said flat articles.

4. Article handling apparatus as set forth in claim 1, wherein a layer of high friction material is applied to said flat face portion for maintaining the initial relationship between said face and the bottom edge of said flat articles.

5. Article handling apparatus as set forth in claim 2, wherein:
said bottom edges extend in a side-by-side relationship transversely across the portion of said slot disposed in said bottom wall,
said slot termination in said front section is at a lesser distance from said bottom than the termination of said slot in said rear section,
said flat face portion slopes upwardly and rearwardly and extends a distance substantially beyond the front and rear sections under conditions where said driven member extends through said space and is urged into engagement with said edges transversely spanning said slot,
said drive means is further adapted to urge said driven member into registration with said slot to the extent necessary to lift said container, whereby said container rests on said flat face portion, and
said flat face portion is serrated for maintaining the initial relationship between said face, the bottom edges of said flat articles and said container.

6. Article handling apparatus as set forth in claim 2 wherein:
said flat articles each comprise a file folder having first and second contiguous panel members attached along said bottom edge and arranged in side-by-side relationship to provide a receptacle for documents or the like, said second panel having a tab portion extending along said top edge and beyond said first panel, and said bottom wall being of sufficient width to permit said folders to rest in said container with said bottom edges spanning said slot under conditions where said driven member is not in engagement therewith, and
said driven member includes a substantially flat face portion adapted to enter said slot in an angular relationship with respect to said bottom wall, and sequentially engage said bottom edges, whereby said tab portions are individually displayed in an echelon type array under conditions where said driven member partially lifts said articles out of said container.

7. In article handling apparatus having an operator work station, the combination comprising:
(a) a plurality of substantially flat articles, each including top and bottom edges,
(b) a container comprising a bottom wall and one or more upright side walls extending therefrom forming a compartment for accommodating said articles in an upright manner, said bottom wall having a slot therein,
(c) conveying means for transporting said container and accommodated articles to the operator work station,
(d) lifting means disposed at said work station, said lifting means including a driven member having a dimension not exceeding the width of said slot, and drive means for urging said member into registration with said slot under conditions where said container is resting at the work station, whereby said member engages the bottom edges of said articles and partially lifts the articles out of said container to expose said top edges, and
(e) said driven member including a portion extending longitudinally with respect to said slot and disposed to lift said container out of engagement with said conveying means under conditions where said member is urged into registration with said slot to partially lift said articles out of said container.

8. Article handling apparatus as set forth in claim 7, wherein:
said flat articles each comprise a file folder having first and second contiguous panel members attached along said bottom edge and arranged in side-by-side relationship to provide a receptacle for documents or the like, said second panel having a tab portion extending along said top edge and beyond said first panel, and
said bottom wall being of sufficient width to permit said folders to rest in said container on said bottom edges under conditions where said driven member is not in engagement therewith, said driven member includes a substantially flat face portion adapted to enter said slot in an angular relationship with respect to said bottom wall, and sequentially engage all of said bottom edges each time said drive means urges said member into registration with said slot, whereby the tab portions of all of said flat articles accommodated by said container are lifted out of said container and individually visible when said driven member partially lifts said articles.

References Cited

UNITED STATES PATENTS

| | | | |
|---|---|---|---|
| 1,842,131 | 1/1932 | Tollefsen | 129—16 |
| 1,845,470 | 2/1932 | Wood | 129—16 |
| 2,386,520 | 10/1945 | Watson. | |

GERALD M. FORLENZA, Primary Examiner

GEORGE F. ABRAHAM, Assistant Examiner

U.S. Cl. X.R.

129—16; 214—310; 312—183, 223